United States Patent [19]
Hsu et al.

[11] Patent Number: 6,054,229
[45] Date of Patent: Apr. 25, 2000

[54] SYSTEM FOR ELECTRIC GENERATION, HEATING, COOLING, AND VENTILATION

[75] Inventors: Michael S. Hsu, Lincoln; Robin Y. Ong, Lexington, both of Mass.

[73] Assignee: Ztek Corporation, Waltham, Mass.

[21] Appl. No.: 08/866,981

[22] Filed: Jun. 2, 1997

Related U.S. Application Data

[60] Provisional application No. 60/022,532, Jul. 19, 1996.

[51] Int. Cl.$^7$ .................................................. H01M 8/04
[52] U.S. Cl. ............................................................ 429/26
[58] Field of Search .................................. 429/17, 19, 22, 429/20, 26

[56] References Cited

U.S. PATENT DOCUMENTS

| | | | |
|---|---|---|---|
| 3,394,032 | 7/1968 | Danner | 136/86 |
| 3,432,353 | 3/1969 | Von Krusenstierna et al. | 136/86 |
| 3,505,114 | 4/1970 | Rohr | 136/86 |
| 3,607,427 | 9/1971 | White | 136/86 |
| 3,616,334 | 10/1971 | Aker et al. | 204/129 |
| 4,085,016 | 4/1978 | Janjua et al. | 204/104 |
| 4,087,976 | 5/1978 | Morrow, Jr. et al. | 60/643 |
| 4,210,512 | 7/1980 | Lawrance et al. | 204/257 |
| 4,482,440 | 11/1984 | Kadija | 204/105 |
| 4,490,445 | 12/1984 | Hsu | 429/32 |
| 4,574,112 | 3/1986 | Breault et al. | 429/26 |
| 4,583,583 | 4/1986 | Wittel | 165/46 |
| 4,593,534 | 6/1986 | Bloomfield | 62/201 |
| 4,623,596 | 11/1986 | Kamoshita | 429/26 |
| 4,629,537 | 12/1986 | Hsu | 204/15 |
| 4,644,751 | 2/1987 | Hsu | 60/676 |
| 4,721,556 | 1/1988 | Hsu | 204/258 |
| 4,839,247 | 6/1989 | Levy et al. | 429/21 |
| 4,853,100 | 8/1989 | Hsu | 204/256 |
| 5,116,696 | 5/1992 | Barp | 429/26 |
| 5,149,601 | 9/1992 | Shiratori et al. | 429/30 |
| 5,185,219 | 2/1993 | Ishihara et al. | 429/31 |
| 5,277,994 | 1/1994 | Sprouse | 429/17 |
| 5,298,341 | 3/1994 | Khandkar et al. | 429/32 |
| 5,338,622 | 8/1994 | Hsu et al. | 429/26 |
| 5,366,819 | 11/1994 | Hartvigsen et al. | 429/17 |
| 5,432,710 | 7/1995 | Ishimaru et al. | 364/493 |
| 5,462,817 | 10/1995 | Hsu | 429/19 |
| 5,501,781 | 3/1996 | Hsu et al. | 204/269 |

FOREIGN PATENT DOCUMENTS

| | | |
|---|---|---|
| 0 338 823 | 10/1989 | European Pat. Off. . |
| 0 355 420 | 2/1990 | European Pat. Off. . |
| 0 357 025 | 3/1990 | European Pat. Off. . |
| 0 437 175 | 7/1991 | European Pat. Off. . |
| WO 94/13026 | 6/1994 | WIPO . |

*Primary Examiner*—Maria Nuzzolillo
*Assistant Examiner*—J. O'Malley
*Attorney, Agent, or Firm*—Lahive & Cockfield, LLP; Anthony A. Laurentano

[57] ABSTRACT

An energy system that couples or integrates an electrochemical converter, such as a fuel cell for the production of electricity, with a Heating, Ventilation and Cooling (HVAC) system, is disclosed. Waste heat generated by the fuel cell is radiatively, convectively, or conductively directed to a thermal component, such as a heat-actuated chiller or a boiler, of an HVAC system. The HVAC system receives the waste heat to produce a conditioned fluid, e.g. heated or cooled air or water, or steam, for heating, cooling, or industrial uses. The invention provides an improved efficiency energy system capable of providing electricity, heating and cooling, such as for a commercial facility or for residences. Also disclosed in an interface exchange element for convectively coupling an electrochemical converter to the HVAC system. The interface exchange element receives heated exhaust gases generated by the fuel cell and extracts heat therefrom for transfer to a thermal component, such as heat-actuated chiller or a boiler, of an HVAC system.

46 Claims, 4 Drawing Sheets

SYSTEM FOR ELECTRIC GENERATION, HEATING, COOLING, AND VENTILATION

This application claims priority under 35 U.S.C. 119(e) to co-pending U.S. provisional application Ser. No. 60/022,532, filed Jul. 19, 1996, the contents of which are hereby incorporated by reference.

BACKGROUND OF THE INVENTION

The present invention relates generally to power, or energy, systems, and specifically to energy systems used in conjunction with the heating, venting and cooling of commercial and residential facilities.

Existing energy systems typically include energy devices that are used daily by individuals to regulate their ambient environment to comfortable levels and to adjust the temperature of other commonly used fluids, such as water and air. These energy devices typically provide conditioned air and water, e.g., heated and cooled water, and steam. Such conventional energy devices include, among other components, steam boilers, thermal fluid boilers, and heat actuated chillers.

Conventional boilers, such as steam boilers, typically employ a central housing, e.g., a vertical cylinder, to boil water by combusting oil, gas or an oil/gas mixture in the center of the cylinder. The water is heated to an elevated temperature by the heat generated by the combustion process. This relatively simple boiler design typically does not employ tubes or coils associated with the cylinder to assist the heating process, thereby eliminating the potential of tube failure and providing for efficient, safe and reliable service. A drawback of the conventional steam boiler is that it is, fuel-wise, relatively inefficient.

In conventional thermal fluid boilers the working fluid flows through one or more coils wound around a heating chamber. The heat produced in the boiler is absorbed by the working fluid and can be used to perform other functions, such as heating or cooling. The advantages of thermal fluid boilers compared to traditional steam boilers includes the elimination of corrosion, scale formation and freezing, thus resulting in reduced maintenance requirements. Thermal boilers further operate at relatively low operating pressures, and can utilize relatively simple working fluids, thus reducing the need of a dedicated boiler operator. A typical thermal fluid also has a greater heat capacity than its steam equivalent.

Conventional energy systems can also include heat actuated coolers or chillers. An example of one common type of an absorption chiller is an ammonia-water absorption chiller, which utilize adsorbent beds. In general, since sorbents take up the working fluid when cooled and desorb the working fluid when heated, the chiller is characterized as being heat driven.

The above conventional energy systems are invariably single function devices, using fuel to provide heating or cooling.

The efficiency of any energy system is always a concern, for economic as well as environmental reasons. Accordingly, there exists a need in the art for higher efficiency energy systems that are readily integrable with commercial or residential facilities to condition, e.g., heat or cool, a selected fluid. In particular, a high efficiency energy system that integrates into the system conventional heating and cooling equipment, such as heating and cooling components common in commercial heating, ventilation and air-conditioning (HVAC) systems, would represent an improvement in the art.

Accordingly, it is an object of the invention to provide an improved, more efficient energy system for conditioning a selected fluid for use in residential or commercial facilities.

The invention will next be described in connection with certain preferred embodiments. However, it should be clear that various changes and modifications can be made by those skilled in the art without departing from the spirit and scope of the invention. For example, various systems employing various system structural components and configurations that utilize the preferred practice of the invention can be employed in conjunction with the aforementioned power system.

SUMMARY OF THE INVENTION

The present invention provides systems and methods for conditioning, e.g., heating, cooling or venting, a selected fluid. This invention attains the foregoing by integrating or coupling an electrochemical converter, such as a fuel cell for electrical generation, with a heating or cooling component of a heating, ventilation, and cooling (HVAC) system. The electrochemical converter, in addition to generating electrical power, also operates similar to a burner for the heating or cooling component of the present invention.

According to one practice, the energy system of the invention includes a fuel cell that produces electricity and waste heat having a selected elevated temperature, and a heat actuated chiller assembly that is coupled to the fuel cell and adapted to receive the waste heat. The chiller absorbs the heat, which actuates the chiller assembly, and in turn provides an output fluid flow having a selected temperature below, and if desired substantially below, the temperature of the fuel cell waste heat. The selected temperature can also be below the ambient temperature of the residential or commercial facility.

According to another aspect, the system includes an element for regulating the waste heat. This element can include a radiation shield that is configured to at least partially surround the fuel cell.

According to another aspect, the heat actuated chiller assembly includes a vapor generator, which is in thermal communication with the fuel cell, for generating a selected vapor therein when heated above a selected temperature. The assembly further includes a condenser that is in fluid communication with the vapor generator for condensing the vapor to a liquid, and an evaporator for converting the liquid back to a vapor.

According to still another aspect, the vapor generator of the heat actuated chiller at least partially encloses the fuel cell, and is adapted to receive the waste heat generated thereby.

In another aspect, the energy system includes an interface exchanging element positioned between the fuel cell and an HVAC system for facilitating heat exchange therebetween. For example, the interface exchanging element can facilitate heat exchange between a cooling component of an HVAC system, such as a heat actuated chiller, and the fuel cell. The interface exchanging element can be adapted to receive thermal energy from an incoming fluid have an elevated temperature, such as a fluid generated by a combustion process, or such as the exhaust gases from a fuel cell, or a fluid produced by some other burner/thermal source, and for transferring the thermal energy to the heat-actuated chiller assembly.

According to one practice, the interface exchanging element includes a plurality of thermally conductive plates, formed of a thermally conductive medium, that are stacked together to form an axially extending assemblage. The external surface of the interface exchanging element is adapted to exchange thermal energy with an environment external to the interface exchanging element, such as the HVAC system.

According to another aspect, the thermally conductive plates include passages for allowing a fluid to flow, in-plane, across the outer surface thereof. The element further includes one or more axial manifolds formed therein, and means for generating a gas flow pressure drop in the passages and between adjacent thermally conductive plates that is substantially greater than the gas flow pressure drop within the axial manifold. The passages are configured to maintain a substantially uniform pressure drop therein to provide for a substantially uniform in-plane distribution of gas along the axial manifold.

According to another practice, the thermally conductive plate is a porous conductive material that allows gas to flow axially through the plate.

According to another practice, the interface exchanging element includes a coiled thermally conductive ribbon adapted for exchanging thermal energy with cooling environment.

According to still another practice, interface exchanging element is composed of a porous, thermally conductive material, and is adapted to receive thermal energy from an input fluid and is adapted to transfer thermal energy therefrom to a cooling environment.

According to another aspect, the present invention provides for an energy system adapted to heat a selected fluid, and includes a fuel cell that produces electricity and waste heat, and a heating component of an HVAC system, such as a boiler system, that is coupled to the fuel cell and adapted to receive the waste heat therefrom.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
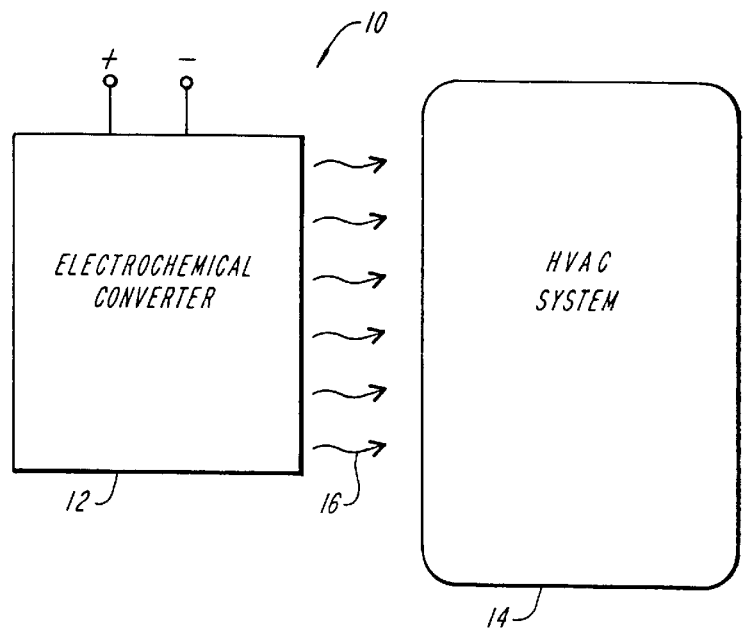
FIG. 1 is a schematic block diagram of the total energy system for generating electrical power and for conditioning a fluid according to the teachings of the present invention.

FIG. 1 is a block diagram schematic representation of the total energy system of the present invention used to condition, e.g., heat and/or cool, a selected fluid. The illustrated total energy system 10 includes an electrochemical converter 12 that is thermally coupled to an HVAC system 14. The electrochemical converter, in addition to generating electricity, preferably creates waste heat which is transferred to the HVAC system 14, as illustrated by wavy lines 16. Electrochemical converters, such as fuel cells, are known in the art, and are shown and described in U.S. Pat. No. 5,462,817 of Hsu, U.S. Pat. No. 5,501,781 of Hsu, and U.S. Pat. No. 4,853,100 of Hsu, all of which are hereby incorporated by reference.

The electrochemical converter 12 can be either radiatively, conductively or convectively coupled to the HVAC system 14. The electrochemical converter of the present invention is preferably a fuel cell, such as a solid oxide fuel cell, a molten carbonate fuel cell, a phosphoric acid fuel cell, an alkaline fuel cell or a proton exchange membrane fuel cell.

HVAC systems commonly utilize a closed loop system for transferring a heat transfer fluid throughout a building. In such a closed loop system, a heating component, such as a steam boiler or a thermal fluid boiler, or a cooling component, such as a heat actuated chiller or other air conditioning component, conditions the heat transfer fluid, which is typically conveyed throughout the facility via fluid conduits. HVAC systems are commonly used for controlling the ambient environmental conditions, such as temperature or humidity, in one or a plurality of structurally enclosed facilities. The HVAC systems come in a number of types, including multizone, dual duct, or terminal reheat-type systems. In general, such HVAC systems include separate sources of heating and cooling within the same system. This configuration allows a single system to both heat and cool the same facility. According to one common practice, a plurality of HVAC systems can be mounted within a single facility, such as a commercial installation, and are connected in a suitable network which is serviced by a common thermal source, which may include either or both a separate heating element and a cooling element. The heating and cooling elements provide the thermal energy required to effectuate either heating or cooling of the facility.

Figure 2:
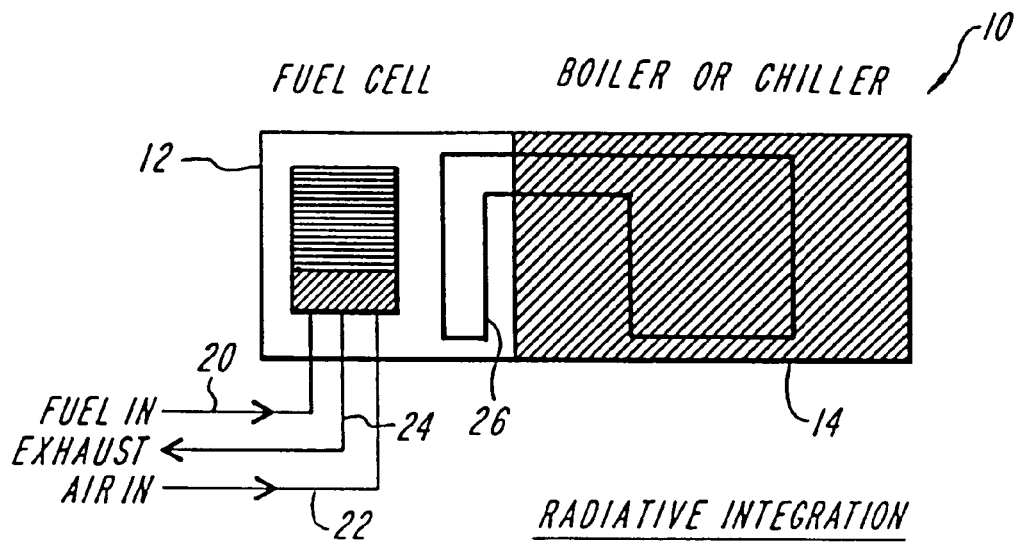
FIG. 2 is a schematic depiction of an energy system that includes a fuel cell radiatively coupled with a heating or cooling component of an HVAC system.

FIG. 2 of the present invention illustrates the integration of the electrochemical converter, e.g., fuel cell 12, and the thermal process component (e.g. a boiler or chiller) of the HVAC system 14 according to the present invention. The illustrated fuel cell has a fuel reactant input 20 and an air reactant input 22. The fuel and oxidizer reactants are introduced to the illustrated fuel cell by way of appropriate manifolding. The fuel cell processes the fuel and oxidizer reactants and generates, in one mode of operation, electricity and waste heat. The waste heat can be radiatively transferred to suitable thermal processing elements 26. The illustrated thermal processing elements 26 help transfer heat radiatively received from the fuel cell 12 to the components of the HVAC system 14. The heat transfer components 26 also serve to regulate the temperature of the fuel cell. The thermal process elements 26 can include, for example, a vapor generator of a heat-actuated chiller that is positioned about or adjacent the fuel cell 12 to receive heat radiated therefrom. The thermal processing elements 26 can also include the boiler of a heating component positioned about or proximate to the fuel cell to receive heat radiated therefrom.

The terms "heating component" and "cooling component" of the HVAC system are meant to include any suitable and known heating and cooling apparatus suitable for use to heat and cool a residential or commercial installation, or other known types of installations. However, the foregoing examples of heating and cooling components are intended to be representative and not exhaustive of all types of heating and cooling apparatus that can be used in conjunction with the energy system of the present invention.

As shown, the illustrated fuel cell 12 also produces exhaust 24 which can be removed from the fuel cell 12. The thermal process elements 26 preferably are thermally coupled to the heating component or cooling component of the HVAC system 14. For example, the fuel cell 12 can generate waste heat which is absorbed by the boiler. The absorbed heat heats a working fluid typically contained therein to a selected elevated temperature, which is then transferred by the HVAC system throughout the facility for selected uses, such as heating, food processing and chemical processing, as well as other like and known uses. In this configuration, the fuel cell 12 thus replaces the burner portion of the boiler.

Figure 3:
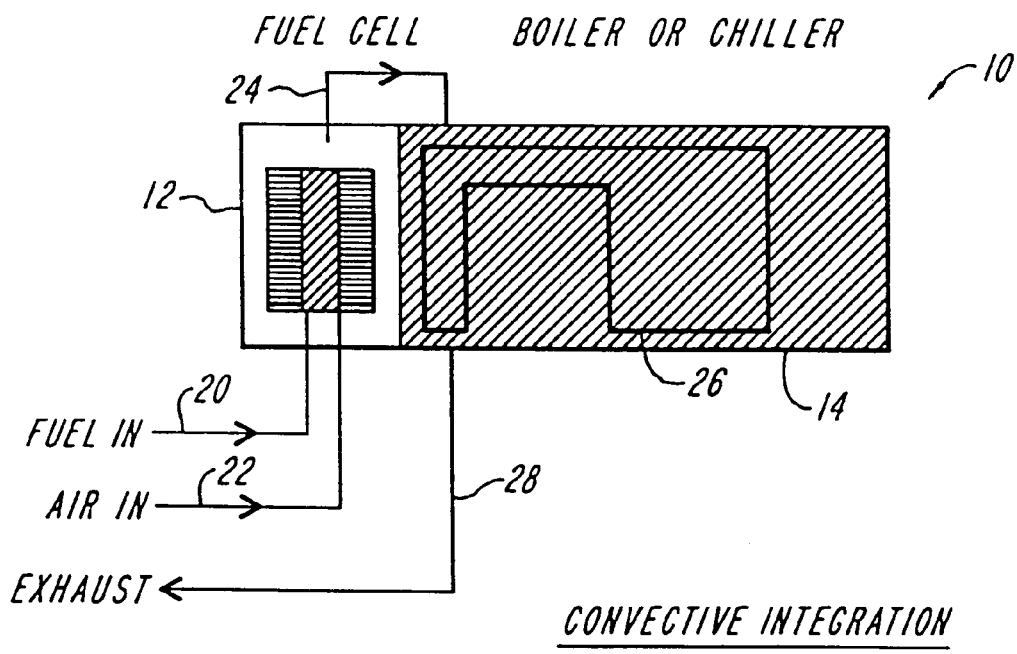
FIG. 3 is a schematic depiction of a power system that includes a fuel cell convectively coupled with a heating or cooling component of an HVAC system.

FIG. 3 illustrates another embodiment of the total energy system 10 of the present invention. The illustrated system 10 includes a fuel cell 12 that is convectively integrated with an HVAC system 14. According to this embodiment, the fuel cell processes fuel and oxidize reactants 20 and 22, respectively, and generates electricity and exhaust 24. The exhaust 24 is directly coupled to appropriate thermal process element 26 of the HVAC system 14. The exhaust is then transferred away from the system, as shown by conduits 28. Those of ordinary skill will recognize although the illustrated embodiment directly couples the exhaust with the HVAC system 14 to convectively transfer heat thereto, other designs exist. For example, an intermediate heat exchanger can be disposed between the fuel cell 12 and the HVAC system 14. According to other embodiments, which would be appreciated by the ordinary skilled artisan, other heat exchanging or thermal process control structure can be used to effectuate the transfer of heat from the exhaust of the fuel cell to one or more components of the HVAC system 14.

An advantage of employing a fuel cell as the burner component of a heating or cooling component includes the generation of electricity as well as a conditioned fluid. The electricity is generated within the fuel cell according to the electrochemical processes, as is known in the art. This electricity can be tapped for external use from the fuel cell by suitable electrical leads. Thus the illustrated integration of the fuel cell with the thermal process element 26 of a heating or cooling component of an HVAC system creates a high efficiency energy system that can provide electricity as well as the cooling and/or heating of residential and commercial facilities. As shown in FIGS. 2 and 3, the thermal energy can be supplied to the thermal process element 26 of the heating or cooling component of the HVAC system by radiation and conduction (FIG. 2) or convection (FIG. 3).

Electrochemical converters suitable for use with the heating component of the HVAC system provide an integrated total energy system for providing electricity and heat to an external facility. A significant advantage of employing the converters are that they are capable of high efficiencies, depending only on the relation between the free energy and enthalpy of the electrochemical reaction and are not limited by carnot-cycle considerations.

Figure 4:
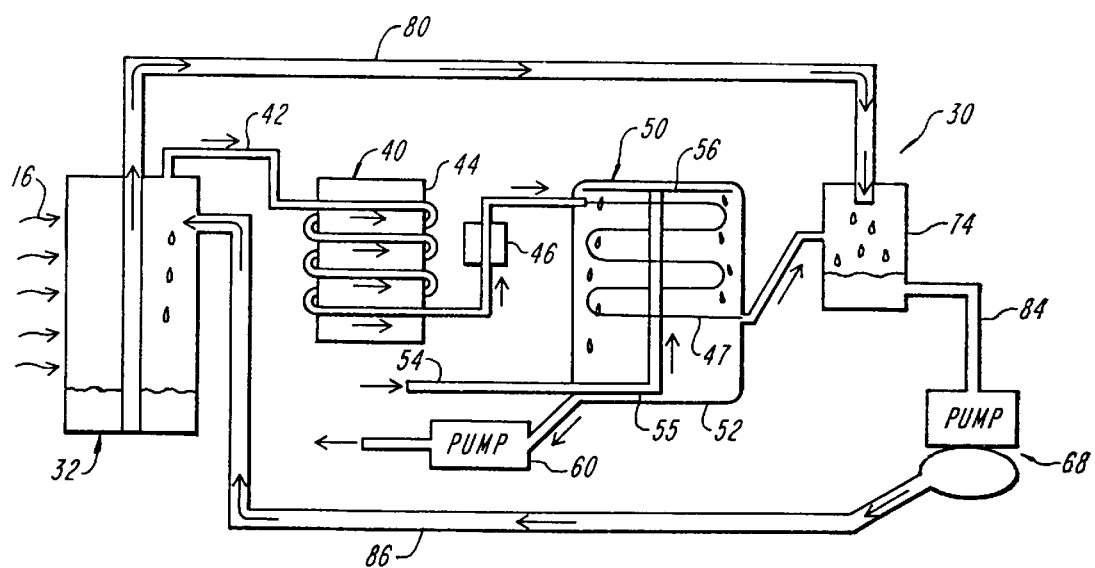
FIG. 4 is a schematic depiction of an energy system including a heat actuated chiller assembly according to the teachings of the present invention.

According to another practice of the invention, shown in FIG. 4, the fuel cell 12 can be integrated with the cooling component of an HVAC system. According to one practice of the invention, shown in FIG. 4, the cooling component 30 comprises an ammonia-water absorption chiller. The illustrated chiller assembly 30 includes a vapor generator 32, a condenser 40, an evaporator 50, a fluid pump 60, and a solution pump 68. The illustrated vapor generator 32 of the chiller assembly 30 absorbs the heat from a heat source 16. The vapor generator 32 preferably contains an environmentally sensitive mixture of ammonia and water. As is known, the ammonia functions as the refrigerant of the assembly and the water functions as the absorbent of the assembly. The heat absorbed by the vapor generator 32 causes the ammonia-water solution to boil. During this boiling process, the ammonia and water separate. The ammonia escapes the vapor generator housing as a gas and is transferred to the condenser unit 40 by suitable fluid conduits 42.

The condenser preferably includes a condenser coil 44 that has coiled thereabout the fluid conduit 42. The condenser coil serves to condense the ammonia vapor traveling through the conduit 42 back to a liquid. As the condensed liquid passes through the conduit 42 and towards the evaporator 50, the condensed liquid can pass through a fluid restrictor 46, which restricts the fluid flow to both lower the pressure and temperature thereof to a selected temperature.

The evaporator 50 preferably includes a housing 52 having a suitable aperture formed therein for input manifold 54 to pass through. Input manifold 54 introduces an input fluid, and further includes internal manifolding which terminates in a fluid disbursement structure 56. The disbursement structure 56 disperses the input fluid over the manifolding 47, connected by a portion of fluid conduit 42 to the fluid restrictor 46, and which winds about the internal manifolding 54 within the evaporator housing, as shown. The ammonia liquid entering the evaporator 50 absorbs the heat from water flowing from the disbursement structure 56. The ammonia liquid absorbs enough heat from the input fluid, such as water, to transform the ammonia back to a gaseous phase. This gaseous phase is transferred to a solution cooled absorber 74.

The absorbent water which initially formed part of the ammoniawater mixture, in which was initially left in the vapor generator 32, is transported to the absorbus 74 along fluid conduit 80. The illustrated fluid conduit 80 can also contain a solution restrictor to load the temperature of the water. This relatively cool absorbent water interacts with the gaseous ammonia to recondense the ammonia to a liquid form. The ammonia-water mixture is then moved through conduit 84 to a solution pump 68, which in turn transfers the solution to the vapor generator 32, along conduit 86.

The relatively cold water which accumulates within the evaporator 50 is then pumped therefrom by pump 60 and transferred to selected locations of a facility for use, for example, in cooling the selected location.

According to one practice, an interface exchanger element can be used, as in FIG. 3, to exchange heat convectively between the fuel cell exhaust 24 and thermal process element 26 of the HVAC system 14.

Figure 5:
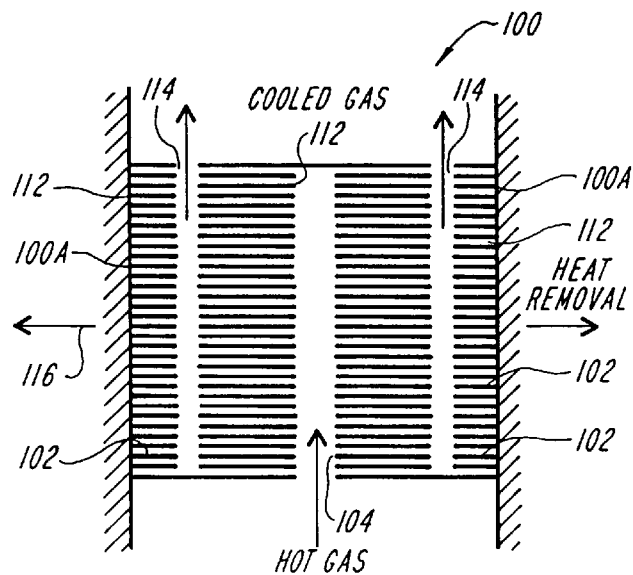
FIG. 5 is a cross-sectional view of a stacked plate type interface exchanging element according to the present invention.

FIGS. 5–9 illustrate an interface exchanging element 100 for use in conjunction with the electrochemical converter 12 and the HVAC system 14 of the present invention to effectuate the convective transfer of thermal energy therebetween. With particular reference to FIG. 5, which is a cross-sectional view of a stacked plate type interface exchanger element 100 according to the present invention, the interface exchanger 100 includes a number of stacked thermally conductive plates 102. The interface exchanger includes a fluid conduit or manifold 104 that is in full communication with the inner portions of the thermally conducting plates 102. The interface exchanger can be housed within a gas tight enclosure or housing 110. The fluid manifold 104 introduces a selected fluid, e.g., such as a gas having an elevated temperature, into the inner regions of the interface exchanger 100. The plates 102 preferably have formed therebetween fluid passages 112 that allow the fluid to flow, in plane, toward the outer surfaces of the plates 102. The gas having the elevated temperature preferably exchanges heat with the thermally conductive plates 102. This heat exchange between the plates 102 and the input fluid cools the fluid, which in turn can be discharged from the interface exchanger 100 via exhaust manifolds 114. The heat absorbed by the thermally conductive plates 102 is discharged from the internal exchanger element 100 to the external environment, as designated by the solid black arrows 116.

The thermally conductive plate 102 can be formed of any suitable thermally conductive material, including metal such as aluminum, copper, iron, steel, alloys, nickel, nickel alloys, chromium, chromium alloys, platinum and nonmetals such as silicon carbide, and other appropriate thermally conductive composite materials. The thickness of the conductive plate 102 can be selected to maintain a selected temperature gradient in the plane of the plate 102, i.e., along the surface of the plate.

Furthermore, the conductive plates form a uniform thermal condition along the axis of the stack (along the outer peripheral surface of the heat exchanging structure 100A) by the uniform distribution of the input fluid through the fluid passages 112, thereby preventing cold or hot spots from developing along the stack. This improves the overall thermal characteristics of the internal exchanging structure and it proves the overall heat exchanging performance of the system.

According to an alternate embodiment, the input fluid can be exhausted along or about the peripheral enclosure 100A of the internal exchanging structure. In this configuration, the gas tight enclosure 100A serves as a peripheral exhaust manifold which collects and transfers the exhaust to any suitable structure.

According to another embodiment, the input fluid can be introduced into the peripheral exhaust manifold formed by the gas tight enclosure 100A and configuration, the input fluid flows radially inward across the surfaces of the conductive plates 12 and can be discharged through one or more of the axially extending manifolds 104 or 114.

A significant advantage of the interface exchanging element 100 of the present invention is that it permits the integration of the interface element with commercial HVAC systems with minimum design alterations of the HVAC systems. Consequently, the interfacing exchanging element 100 can be utilized with a broad range of commercial units and thus for a broad range of commercial applications. The interface exchanging element provides for a number of desirable features, including (1) high heat transfer effectiveness leading to high HVAC system efficiencies (2) high heat transfer flux leading to a relatively compact design, which provides for increased use and a broader range of applications for the total energy system, and (3) a compact size that allows the interface exchanging element to be retrofitted into existing commercial HVAC equipment.

In operation, the interface exchanging element 100 is geometrically matched with a thermal process element 26, such as the vapor generator 32 portion of the heating or cooling element, or the boiler portion of a heating component, of the HVAC system, to facilitate thermal exchange between the fuel cell and the vapor generator or boiler portion.

With reference again to FIG. 2 and 3, the interface exchanging element can be interposed between the fuel cell 12 and the HVAC system 14 to provide for the direct exchange of thermal energy therebetween. Conversely, the fuel cell stack itself can function as an interface heater when placed in direct contact with one or more components with the HVAC system 14, by radiatively transferring waste heated generated thereby to the HVAC component. However, this direct integration of the fuel cell component and the HVAC system requires the geometrical matching of the fuel cell stacks and the thermal process element of the HVAC system. This results in alteration of the fuel cell stack and design, which can lead to increased costs associated with the system. Hence, according to a preferred practice, the interface exchanging element 100 is geometrically configured to match the fuel cell and the HVAC system, so as to directly couple them, thus resulting in a relatively compact and easy to use and highly efficient total energy system for. The illustrated interface exchange element 100 thus provides for a plate type exchanger which has excellent thermal performance characteristics and allows for effective thermal integration with the thermal process element 26 of the HVAC system. The interface exchanging element of the present invention overcomes the size disadvantages of conventional heat exchangers by utilizing a compact, highly efficient heat exchanger that can transfer heat by conductive and/or convective heat transfer techniques.

Preferably, the fluid passages 112 are formed within the interface element 100 such that the pressure drop in the fluid passages 112 is substantially greater than the pressure drop along the fluid manifold 104. More specifically, the flow resistance of the fluid passages 112 is substantially greater than the flow resistance of the manifold 104.

According to one embodiment, the stacked internal exchanging element 100 is a columnar structure, and the thermally conductive plates 102 have a diameter between about 1 inch and about 20 inches and have a thickness between about 0.002 inchesd and about 0.2 inches. The term columnar as used herein is intended to describe various geometric structures that when stacked along a longitudinal axis have at least one internal fluid manifold which serves a conduit for a fluid mixture. Those of ordinary skill will appreciate that the internal exchanging element 100 can have other geometric configurations, such as rectangular or rectilinear shapes with an internal or external manifold. The plates having a selected rectangular configuration can be stacked and integrated with attached external manifolds for the supply and collection of the fluid, e.g., hot or cold gas. The exact configurations of the interface exchanging element are designed with the geometrical configuration of the thermal process element of the HVAC system in mind.

Figure 6:
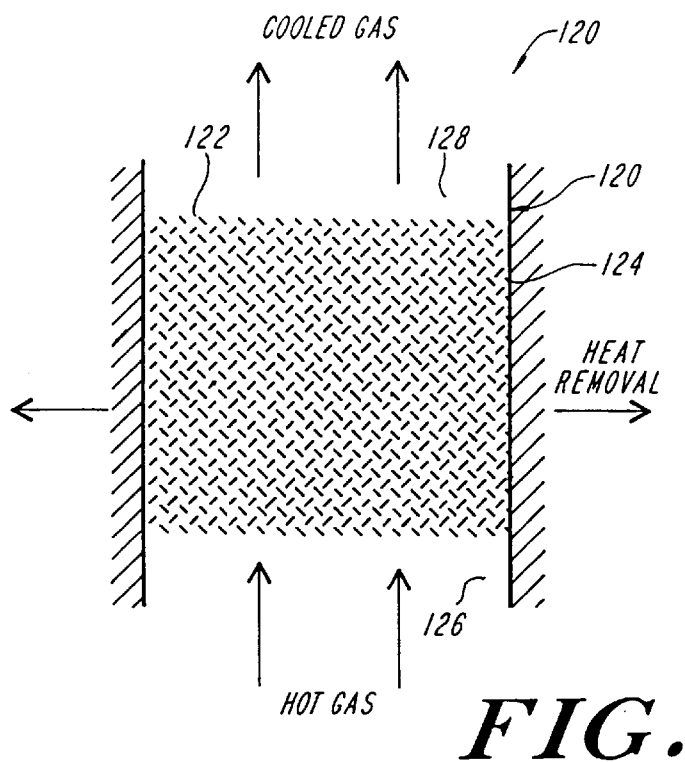
FIG. 6 is a cross-sectional view of an interface exchanging element incorporating a porous thermally conductive material according to the present invention.

FIG. 6 illustrates a cross-sectional view of another embodiment of the interface exchanging element of the present invention utilizing a porous medium. The illustrated exchanging element 120 has a substantially cylindrical shape having an outer peripheral surface 124 for contacting the thermal process element 26 of the HVAC system and is composed of a substantially porous thermally conductive media 122. As shown, a selected input fluid having an elevated temperature is introduced at the input side 126 of the interface exchanging element, and is exhausted from an output side 128 thereof. A thermally conductive media 122 absorbs heat from the input fluid and thus exhausts a relatively cool fluid having a temperature below, and preferably substantially below, that of the input fluid. The heat absorbed by the porous thermally conductive media 122 is transferred therefrom by conduction or convection to the thermal process element 26. The illustrated internal exchanging element 120 can be utilized in a manner similar to the interface exchanging element shown and described in FIG. 5. Similar to the interface exchanging element 100 of FIG. 5, the exchanging element 120 can have any selective geometrical configuration suitable for use with conventional HVAC systems.

Figure 7:
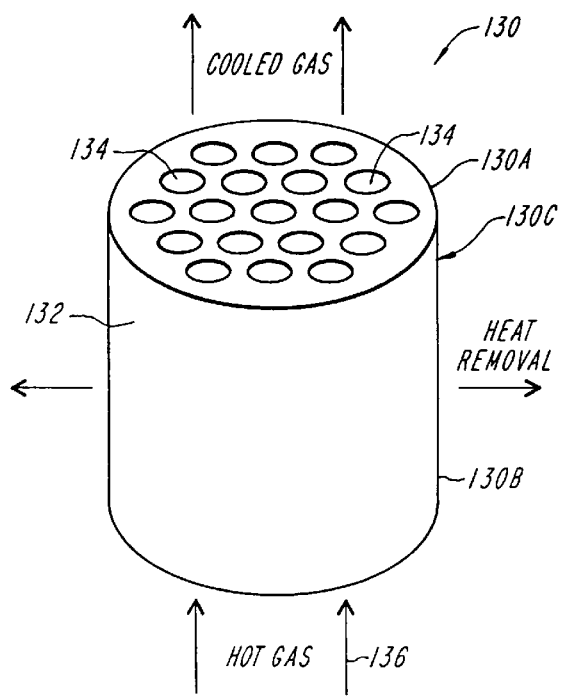
FIG. 7 is a plan view of an interface exchanging element with axial flow passages according to the present invention.
Figure 8:
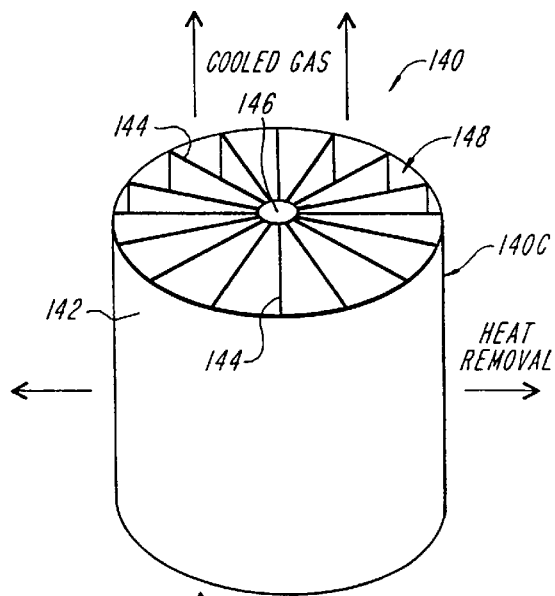
FIG. 8 is a plan view of an interface exchanging element of a "wagon wheel" design according to the present invention.
Figure 9:
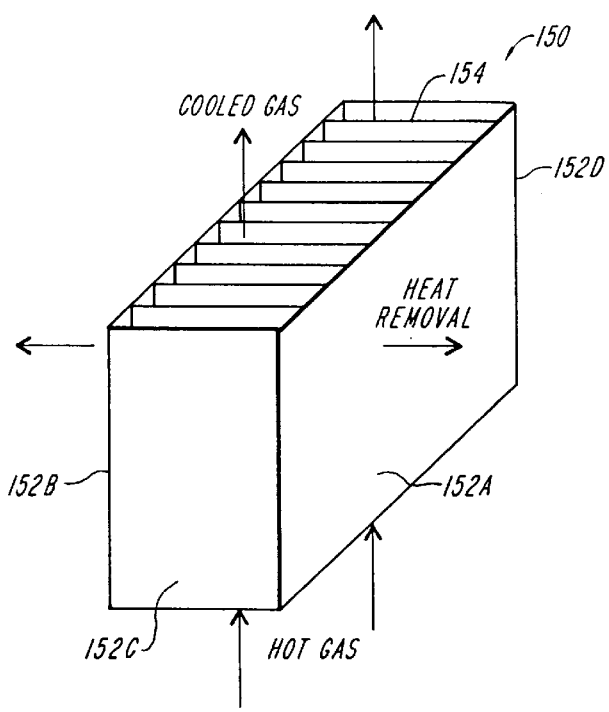
FIG. 9 is a plan view of a fin type interface exchanging element according to the present invention.

FIGS. 7 through 9 illustrate further embodiments of the interface exchanging element of the present invention. As shown in FIG. 7, the interface exchanging element 130 has a substantially cylindrical housing having an outer surface 132 and a length that extends along a longitudinal axis. The interface exchanging element 130 is apertured with a plurality of axial passages 134 that extend between the top 130A and the bottom 130B of the exchanging element.

The interface exchanging element is preferably made of a thermally conductive material similar to that of the interface exchanging elements shown and described in FIGS. 5 and 6.

The illustrated interface exchanging element 130 operates in a manner similar to that previously described. For example, an input fluid 136 having a selected elevated temperature is introduced to the interface exchanging element, e.g., into the bottom 130B of the exchanging element, passes through the axial manifolds 134, and is exhausted at the opposite end. As the input fluid 136 travels through the interface exchanging element 130, heat is absorbed therefrom by the thermally conductive body of the exchanging element. Consequently, heat is absorbed from the incoming fluid and is exhausted from the exchanging element having a temperature substantially below that of the input fluid. Thermal energy is conducted to its outer surface 132 which is in contact with the thermal process element 26, of the HVAC system, for exchanging heat therebetween.

Alternate embodiments of the interface exchanging element includes the embodiment shown in FIG. 8. In this embodiment, the interface exchanging element 140 has a substantially cylindrical configuration having an outer surface 142 and a plurality of spokes 144 that extend radially outward from a central hub portion 146, and which terminate along an inner wall 148 of the exchanging element in 140, as a wagon wheel configuration.

FIG. 9 illustrates another embodiment of the interface exchanging element 150 according to the teachings of the present invention. The illustrated exchanging element 150 has a substantially rectangular configuration having a plurality of sides 152A–152D and a plurality of fins 154 which extend between sides 152A and 152B. The fins are also spaced apart along an axis that extends between sides 152C and 152D. The illustrated exchanging element 150 is preferably formed of a thermally conductive material which absorbs heat from the input fluid. Consequently, the fluid is discharged therefrom at a temperature substantially below that of the incoming fluid. The thermal energy is conducted to its outer surface 152A and 152B which is typically in contact with the thermal process element 26 of the HVAC system for exchanging heat therebetween.

The illustrated thermal integration of the electrochemical converter with the HVAC system defines an improvement in the art. The illustrated hybrid total energy system 10 used for supplying electricity and cooling or heating fluid to a residential or commercial facility has many advantages for energy service companies. One such benefit accrues since the electrochemical converter operates as a burner in that it supplies heating or cooling processes, as well as generates electricity during use. Hence, the electrochemical converter can utilize as a fuel reactant supply natural gas which in turn services both the electrical and thermal needs of the end users. Use of such fuel component provides for an environmentally safe, noiseless and exceptionally clean and compact total energy system that supports installation in relatively small and convenient locations.

Another significant advantage of the present invention is that the total energy system can be installed, as needed, at or near the facilities where the conditioned fluid and or electricity produced by the system is to be used, thus providing for savings in electrical transmission. These systems can be configured to operate continuously base-loaded or on an as needed basis. Other advantages include the relatively easy and safe replacement of the fuel cell, or selected components thereof, during use in the field without requiring significant dismantling of the entire system.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An energy system for providing electricity and conditioning a selected fluid, comprising
   a fuel cell having means for producing electricity, waste heat and exhaust having a selected elevated temperature,
   a thermal energy device for conditioning the fluid, said thermal energy device providing an output fluid flow having a selected temperature relative to said waste heat, and
   an interface exchanging element positioned between said fuel cell and said thermal energy device for facilitating heat exchange between the exhaust of said fuel cell and the thermal energy device, said interface exchanging element being constructed to receive heat from said exhaust when passing therethrough, said interface exchanging element conveying heat conductively to said thermal energy device.

2. The energy system according to claim 1, wherein said interface exchanging element receiving heat radiatively, conductively or convectively from said fuel cell exhaust.

3. The energy system according to claim 1, wherein said thermal energy device is disposed in direct contact with said interface exchanging element.

4. The energy system of claim 1, wherein said interface exchanging element is disposed so as to directly receive said fuel cell exhaust, and wherein said interface exchanging element is adapted to convey said heat to said thermal energy device to provide for conductive exchange of heat therebetween.

5. The energy system according to claim 1, wherein said thermal energy device is a component of an HVAC system.

6. The energy system according to claim 1, wherein said thermal energy device comprises a heat actuated chiller assembly coupled to said interface exchanging element and adapted to receive heat therefrom for actuating said chiller assembly, said chiller assembly providing an output fluid flow sufficient for cooling the selected fluid and having a selected temperature below the temperature of said waste heat of said fuel cell.

7. The energy system according to claim 6, wherein said heat actuated chiller assembly comprises
a vapor generator in thermal communication with said fuel cell for generating vapor when heated above a selected temperature,
a condenser in fluid communication with said vapor generator for condensing said vapor to a liquid, and
an evaporator for converting said liquid back to a vapor.

8. The energy system according to claim 7, wherein said vapor generator of said heat actuated chiller assembly at least partially encloses said fuel cell, and is adapted to receive said waste heat generated thereby by radiation, or optionally wherein said vapor generator is adapted to exchange thermal energy with said interface exchanging element.

9. The energy system according to claim 1, wherein said thermal energy device comprises a boiler coupled to said fuel cell and adapted to receive said waste heat therefrom, said boiler being adapted to heat the selected fluid to a selected elevated temperature, and optionally wherein said boiler is a steam boiler or a thermal fluid boiler.

10. The energy system according to claim 9, wherein said thermal energy device further comprises a vapor generator, said vapor generator being adapted to exchange thermal energy with said interface exchanging element.

11. The energy system according to claim 1, further comprising means for introducing one of a fuel reactant and an oxidizer reactant to said fuel cell, and wherein said fuel cell comprises means for processing said reactants to produce said electricity and said waste heat.

12. The energy system according to claim 1, wherein said elevated temperature of said waste heat is in the range between about 100° C. and about 1200° C.

13. The energy system according to claim 1, wherein said fuel cell is selected from the group consisting of a solid oxide fuel cell, molten carbonate fuel cell, phosphoric acid fuel cell, alkaline fuel cell and proton exchange membrane fuel cell.

14. The energy system according to claim 1, wherein said fuel cell radiates said waste heat therefrom, said system further comprising means for regulating said waste heat.

15. The energy system according to claim 1, wherein said fuel cell comprises
a plurality of electrolyte elements having an oxidizer electrode on one side and a fuel electrode on an opposing side, and
a plurality of interconnector elements for providing electric contact with said electrolyte elements, wherein said electrolyte elements and said interconnector elements are alternately stacked to form said fuel cell.

16. The energy system according to claim 1, wherein said interface exchanging element comprises a plurality of thermally conductive plates formed of a thermally conductive material, said plates being stacked together to form said exchanging element, said exchanging element having an external surface adapted for exchanging thermal energy with said thermal energy device.

17. The energy system according to claim 16, wherein said thermally conductive plates comprise passage means for allowing a fluid to flow, in-plane, thereacross.

18. The energy system according to claim 17, wherein said interface exchanging element further comprises
one or more axial manifolds formed therein, and
means for generating a gas flow pressure drop in the passage means and between adjacent thermally conductive plates that is substantially greater than the gas flow pressure drop within the axial manifold, thereby providing a substantially uniform flow of gas along the axial manifold.

19. The energy system according to claim 16, wherein said thermally conductive plate is formed of a porous conductive material, said porous material forming passage means for allowing gas to flow axially through said plate.

20. The energy system according to claim 1, wherein said interface exchanging element comprises a spiraling thermally conductive ribbon.

21. The energy system according to claim 1, wherein said interface exchanging element is composed of a porous, thermally conductive material.

22. The energy system according to claim 1, wherein said interface exchanging element has a generally cylindrical shape having a diameter between about 1 inch and about 20 inches.

23. The energy system according to claim 1, wherein said interface exchanging element has a generally rectangular cross section.

24. A method for providing electricity and conditioning a selected fluid, comprising
providing a fuel cell for producing electricity, waste heat and exhaust having a selected elevated temperature,
conditioning the selected fluid with a thermal energy device, said thermal energy device providing an output fluid flow having a selected temperature relative to said waste heat, and
facilitating conductive heat exchange between the exhaust of said fuel cell and the thermal energy device with an interface exchanging element positioned between said fuel cell and said thermal energy device, said interface exchanging element receiving heat from said exhaust when passing therethrough, and
conveying said heat conductively from said interface exchanging element to said thermal energy device.

25. The method according to claim 24, further comprising the step of coupling said interface exchanging element so as to receive heat radiatively, conductively or convectively from said fuel cell exhaust.

26. The method according to claim 24, further comprising the step of positioning said thermal energy device in direct contact with said interface exchanging element.

27. The method according to claim 24, further comprising the step of positioning said interface exchanging element to directly receive said fuel cell exhaust.

28. The method according to claim 24, further comprising the step of directly exchanging heat between said interface exchanging element and said thermal energy device.

29. The method according to claim 24, wherein said thermal energy device is a component of an HVAC system.

30. The method according to claim 24, wherein said step of conditioning said selected fluid with a thermal energy device comprises the steps of
providing a heat actuated chiller assembly which is coupled to said fuel cell,
thermally actuating said chiller assembly, and cooling the selected fluid such that it has a selected temperature below the temperature of the fuel cell waste heat.

31. The method according to claim 30, wherein said step of providing a heat actuated chiller assembly further comprises the steps of providing a vapor generator in thermal communication with said fuel cell for generating vapor when heated above a selected temperature, providing a condenser in fluid communication with said vapor generator for condensing said vapor to a liquid, and providing an evaporator for converting said liquid back to a vapor.

32. The method according to claim 31, further comprising the step of exchanging thermal energy between said vapor generator and said interface exchanging element.

33. The method according to claim 24, wherein said step of conditioning said selected fluid with a thermal energy device further comprises the steps of providing a boiler which is in thermal communication with said fuel cell and adapted to receive said waste heat therefrom, and heating the selected fluid to a selected elevated temperature.

34. The method according to claim 33, further comprising the step of providing a vapor generator adapted for exchanging thermal energy with said interface exchanging element, and optionally for generating a vapor from a working fluid in response to said waste heat of said fuel cell.

35. The method according to claim 24, further comprising the steps of introducing one of a fuel reactant and an oxidizer reactant to said fuel cell, and processing said reactants to produce said electricity and said waste heat.

36. The method according to claim 24, further comprising the step of selecting said fuel cell from the group consisting of a solid oxide fuel cell, molten carbonate fuel cell, phosphoric acid fuel cell, alkaline fuel cell and proton exchange membrane fuel cell.

37. The method according to claim 24, wherein said fuel cell radiates said waste heat, further comprising the step of regulating said waste heat.

38. The method according to claim 24, wherein said step of providing said fuel cell further comprises the steps of providing a plurality of electrolyte elements having an oxidizer electrode on one side and a fuel electrode on an opposing side, and providing a plurality of interconnector elements for providing electric contact with said electrolyte elements, wherein said electrolyte elements and said interconnector elements are alternately stacked to form said fuel cell.

39. The method according to claim 24, wherein said step of facilitating heat exchange with said interface exchanging element further comprises the steps of providing a plurality of thermally conductive plates formed of a thermally conductive material, and stacking said plates together to form said interface exchanging element, said exchanging element having an external surface adapted for exchanging thermal energy with said thermal energy device.

40. The method according to claim 39, further comprising the step of forming one or more passages in said plate for allowing a fluid to flow, in-plane, thereacross.

41. The method according to claim 40, further comprising the steps of forming- one or more axial manifolds in said interface exchanging element, and generating a gas flow pressure drop in the passage and between adjacent thermally conductive plates that is substantially greater than the gas flow pressure drop within the axial manifold, thereby providing a substantially uniform flow of gas along the axial manifold.

42. The method according to claim 41, further comprising the step of maintaining a substantially uniform pressure drop within the passages to provide for a substantially uniform flow of gas along the axial manifold.

43. The method according to claim 39, further comprising the step of forming said thermally conductive plate from a porous conductive material, said porous material forming passages for allowing gas to flow axially through said plate.

44. The method according to claim 24, further comprising the step of forming said interface exchanging element into a spiraling thermally conductive ribbon.

45. The method according to claim 24, further comprising the step of composing said interface exchanging element of a porous thermally conductive material.

46. The method according to claim 24, further comprising the step of forming said interface exchanging element into a generally cylindrical shape having a diameter between about 1 inch and about 20 inches, or optionally forming said interface exchanging element into a generally rectangular cross-section.

* * * * *

UNITED STATES PATENT AND TRADEMARK OFFICE
CERTIFICATE OF CORRECTION

PATENT NO. : 6,054,229
DATED : April 25, 2000
INVENTOR(S) : Michael S. Hsu, Robin Y. Ong Page 1 of 1

It is certified that error appears in the above-identified patent and that said Letters Patent is hereby corrected as shown below:

Title page,
Please replace the title: "...HEATING, COOLING, AND VENTILATION" with the correct amended title: -- ...HEATING, COOLING AND VENTILATION --

Column 6,
Line 47, please replace "of the ammoniawater" with -- of the ammonia-water --;

Column 7,
Line 52, please replace "100A and configuration, the input fluid" with -- 100A and then into the stacked exchanging structure 100 along the peripheral edges. In this configuration, the input fluid --;

Column 9,
Line 26, please replace "of the exchanging element. ¶ The interface" with -- of the exchanging element. The interface --.

Signed and Sealed this

Twelfth Day of March, 2002

Attest:

Attesting Officer

JAMES E. ROGAN
Director of the United States Patent and Trademark Office